United States Patent
Stollmann et al.

(10) Patent No.: US 9,490,657 B2
(45) Date of Patent: Nov. 8, 2016

(54) RECUPERATIVE CABLEWAY SYSTEM WITH FUEL CELLS

(76) Inventors: Vladimir Stollmann, Zvolenska Slatina (SK); Stefan Ilcik, Banska Bystrica (SK); Jozef Suchomel, Zvolen (SK); Peter Smal, Mosovce (SK)

( * ) Notice: Subject to any disclaimer, the term of this patent is extended or adjusted under 35 U.S.C. 154(b) by 767 days.

(21) Appl. No.: 13/989,239

(22) PCT Filed: Nov. 28, 2011

(86) PCT No.: PCT/SK2011/050021
§ 371 (c)(1), (2), (4) Date: May 23, 2013

(87) PCT Pub. No.: WO2012/074494
PCT Pub. Date: Jun. 7, 2012

(65) Prior Publication Data
US 2013/0241315 A1 Sep. 19, 2013

(30) Foreign Application Priority Data
Nov. 29, 2010 (SK) .................................. 50053-2010

(51) Int. Cl.
*H02J 7/34* (2006.01)
*B61B 7/02* (2006.01)
*B66C 13/22* (2006.01)
*B66C 21/00* (2006.01)

(52) U.S. Cl.
CPC . *H02J 7/34* (2013.01); *B61B 7/02* (2013.01); *B66C 13/22* (2013.01); *B66C 21/00* (2013.01); *Y02T 30/30* (2013.01); *Y10T 307/469* (2015.04); *Y10T 307/74* (2015.04); *Y10T 307/766* (2015.04)

(58) Field of Classification Search
CPC ........................................................ H02J 7/34
See application file for complete search history.

(56) References Cited

U.S. PATENT DOCUMENTS

2011/0120811 A1* 5/2011 Kallioniemi .......... B66B 1/2458
187/382

* cited by examiner

*Primary Examiner* — Fritz M Fleming

(57) ABSTRACT

The recuperative cableway system with fuel cells (10) serves for transportation of the load using a skyline (1), mainly for skidding, which uses gravity of the carriage (18) and load (19) to run an electric generator (8) with the help of a winding device (3) and a clutch (5), and voltage from electric generator (8) helps electrolysis of water in fuel cells (10), where oxygen and hydrogen are produced, and consequently they synthesize in fuel cells (10) into water when pulling an empty carriage up the hill, and at the same time, voltage is produced, and it is transmitted through the switch (13) into an electric motor (9), it runs the winding device (3) using a clutch (6) and it helps to pull the empty carriage up the hill.

2 Claims, 1 Drawing Sheet

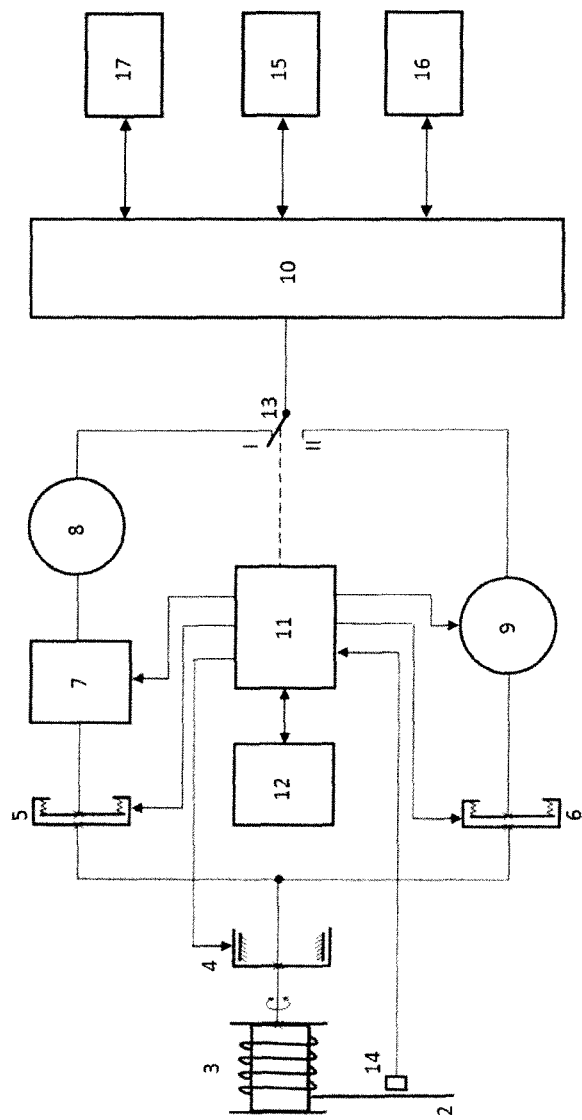

RECUPERATIVE CABLEWAY SYSTEM WITH FUEL CELLS

TECHNICAL FIELD

The invention refers to a recuperative cableway system, mainly for skidding, which consists of a fuel cell drive system.

BACKGROUND OF ART

The forest cableways used up to the present day spend kinetic and potential energy of load on thermal energy in service brakes of driving drums when being yarded with the help of a skyline down the hill. Service brakes are usually constructed as drum, disc and band ones. They get warm and are worn intensively when working, therefore the retarding braking system is used, too. The retarding braking system is mostly implemented as an aerodynamic or electric one on the basis of eddy current.

The solution according to an inventor prof. Roska is also known—it is solution No. 261066, 1988, B 61 B 7/00 named "Cablecrane Supplement for Wood Extraction". This is device which enables to use an excess energy of load to pull another load under a skyline in overlapping time.

In the area of recuperative cableway systems, there is also known the solution according to the invention No. 286944 named "Recuperative Cableway System for Logging". This cableway system for logging consists of an electric drive unit with recuperation of energy by means of a rotary voltage generator.

Next, there is a known solution according to the patent No. 287413 named "Thermoelectric Recuperative Cableway System". It is a recuperative cableway system with an electric or hybrid drive using thermoelectric cells in the brake system of a winding device to recover energy.

Then, there is a solution according to the patent No. 287411 named "Hydraulic Recuperative Cableway System". It is a recuperative cableway system with a hydraulic drive using a hydraulic accumulator to recover energy.

Then, there is a solution according to the patent No. 287412 named "Pneumatic Recuperative Cableway System". It is a recuperative cableway system using a pneumatic accumulator to recover energy.

Next known solution is according to the patent No. 287441 named "Mechanical Recuperative Cableway System with a Flywheel". It is a recuperative cableway system using a flywheeel energy accumulator.

These recuperative cableway systems don't use fuel cells to recover gravitational energy of the carriage and load. The principles which are used to recover energy of carriage and load in the phase of gravitational skidding, are characterized by lower efficiency of energy transformation, lower performance, or higher construction complexity.

DISCLOSURE OF THE INVENTION

The drawbacks, listed above, are mostly eliminated by a recuperative cableway system with fuel cells for downhill yarding using a skyline. The system is based on the fact that, when the carriage and load drive down the hill, the excess gravitational energy of the carriage and load is used for electrolysis of water in a fuel cell. Hydrogen and oxygen made by electrolysis are stored in tanks used as an energy accumulator. Energy is obtained retrospectively by bonding of hydrogen and oxygen, sometimes refered to as "cold combustion", which takes place when voltage in fuel cells arises. Generated voltage is used to connect the cableway system, e.g. to pull an empty carriage up the hill using the skyline.

System according to the invention is characterized by the fact that it is energy-saving and ecologically clean one.

BRIEF DESCRIPTION OF THE INVENTION

More details are provided in FIG. 1, which shows the system diagram.

DETAILED DESCRIPTION OF THE INVENTION

The cableway system according to FIG. 1 consists of winding device 3, mainline 2, brake 4, clutches 5 and 6, gearbox 7, electric generator 8, electric motor 9, electric switch 13, fuel cell batteries 10, oxygen tank 15, hydrogen tank 16, water tank 17, mainline 2 speed sensor 14, control panel 12, electronic control unit 11.

The system according to FIG. 1 works as follows. When the command for downhill yarding goes from a control panel 12 to an electronic control unit 11, the electronic control unit 11 disconnects a clutch 6, connects a clutch 5, unbrakes a winding system 3 using a brake 4 and turns an electric switch 13 into position "I". A main line 2 starts pulling from the winding device 3 due to gravity of the carriage and load or due to gravitational force of the carriage and load and sets the winding device 3 in rotary motion. Rotary motion of the winding device 3 is transmitted into an electric generator 8 through the clutch 5 and a gearbox 7. When skidding, the electronic control unit 11 follows unwinding speed of the mainline 2 from the winding device 3 using the speed sensor 14 of the mainline 2. On the basis of data on a speed sensor 14 of the mainline, the electronic control unit 11 changes gear in the gearbox 7 so that the motion of the carriage and load was according to speed limit. In the case, when gear changing is inefficient, and the speed of the carriage and load increases, the electronic control unit 11 will actuate the brake 4. The electric generator 8 generates voltage in this phase, the voltage is used to electrolysis of water, which is located in a tank 17. Hydrogen and oxygen are produced during electrolysis, and they are stored in tanks 15 and 16 for later use. After finishing the skidding operations, the electronic control unit 11 disconnects the clutch 5 and applies the brake 4.

When the command comes from the control panel 12 to the electronic control unit 11 to pull an empty carriage back up the hill, the electronic control unit 11 will disconnect the clutch 5, connect the clutch 6, unbrake the winding device 3 using the brake 4 and turn the electric switch 13 into position "II". Voltage produced in fuel cells 10 when hydrogen and oxygen from tanks 15 and 16 are bonding, will be brought into the electric motor 9 through the electric switch 13. Water, which is stored in the tank 17, is a result of chemical reaction. Rotary moment of an electric motor 9 is transmitted through the clutch 6 into the winding device 3. Winding speed of the mainline 2 is controlled by the electronic control unit 11 with a built-in frequency changer.

The brake 4 is used only to slow down the carriage and to anchor the carriage to the skyline 1.

It is possible to use the system everywhere, where we can do downhill yarding or downhill material transport.

The invention claimed is:
1. Recuperative cableway system with fuel cells consisting of a winding device (3), braking system (4), gearbox (7), clutches (5,6), rotary voltage generator (8) voltage, electric switch (13), electric motor (9), fuel cells (10), speed sensor (14) of cable carriage, control panel (12), control unit (11), oxygen tank (15) and water tank (16), characterised in that the winding device (3) equipped with braking system (4), is connected through gearbox (7) using the clutch (5) with rotary voltage (8) generator which is through electric switch (13) in position I connected to fuels cells (10) which are connected to oxygen tank (15), hydrogen tank (16) and water tank (17), and through electric switch (13) in position II are fuel cells (10)connected to electric motor (9) which is through clutch (6) connected to winding device (3).

2. Recuperative cableway system with fuel cells according to claim 1, characterised in that the control unit (11) connected via electric conductors to braking system (4), clutches (5,6), gearbox (7), electric motor (9), speed sensor (14) of cable carriage and control panel (12).

* * * * *